(12) United States Patent
Hall et al.

(10) Patent No.: US 8,029,041 B2
(45) Date of Patent: Oct. 4, 2011

(54) DOOR TRIM-INTEGRATED PELVIC IMPACT ENERGY-ABSORBING CONSTRUCTION FOR VEHICLE

(75) Inventors: Ian Brewster Hall, Kensington, MD (US); John Pinkerton, Canton, MI (US); Ammad Bhatti, Canton, MI (US); Srinivas Sanikommu, Grosse Pointe Woods, MI (US); Zhibing Deng, Northville, MI (US); Leiping Huang, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/101,967

(22) Filed: Apr. 12, 2008

(65) Prior Publication Data

US 2009/0256391 A1 Oct. 15, 2009

(51) Int. Cl.
*B60J 5/04* (2006.01)
*B60R 21/04* (2006.01)

(52) U.S. Cl. ............ 296/146.6; 296/187.05; 296/187.12; 296/146.7

(58) Field of Classification Search ............... 296/187.05, 296/187.12, 146.6, 146.7
See application file for complete search history.

(56) References Cited

U.S. PATENT DOCUMENTS

| | | | | |
|---|---|---|---|---|
| 3,933,387 A | * | 1/1976 | Salloum et al. | 293/120 |
| 3,989,275 A | * | 11/1976 | Finch et al. | 280/751 |
| 4,890,877 A | * | 1/1990 | Ashtiani-Zarandi et al. | 296/146.7 |
| 5,040,335 A | * | 8/1991 | Grimes | 49/502 |
| 5,306,066 A | * | 4/1994 | Saathoff | 296/146.6 |
| 5,433,478 A | * | 7/1995 | Naruse | 280/751 |
| 5,573,272 A | * | 11/1996 | Teshima | 280/751 |
| 5,573,298 A | * | 11/1996 | Walker et al. | 296/187.12 |
| 5,636,866 A | * | 6/1997 | Suzuki et al. | 280/748 |
| 5,806,889 A | * | 9/1998 | Suzuki et al. | 280/748 |
| 5,820,191 A | * | 10/1998 | Blakewood et al. | 296/37.13 |
| 5,844,518 A | * | 12/1998 | Berg et al. | 342/2 |
| 5,857,702 A | * | 1/1999 | Suga et al. | 280/751 |
| 5,925,435 A | * | 7/1999 | Togawa et al. | 428/120 |
| 5,934,730 A | * | 8/1999 | Yagishita et al. | 296/39.1 |
| 6,203,096 B1 | * | 3/2001 | Noda et al. | 296/146.6 |
| 6,357,812 B1 | * | 3/2002 | Adachi et al. | 296/39.1 |
| 6,474,721 B2 | * | 11/2002 | Nishikawa et al. | 296/146.6 |
| 6,543,838 B1 | * | 4/2003 | Bertolini et al. | 296/146.1 |
| 6,546,674 B1 | * | 4/2003 | Emerling et al. | 49/502 |
| 7,097,234 B2 | * | 8/2006 | Schonebeck | 296/187.03 |
| 7,198,319 B2 | * | 4/2007 | Schroder et al. | 296/146.7 |
| 7,291,378 B2 | * | 11/2007 | Cowelchuk et al. | 428/140 |
| 7,357,444 B2 | * | 4/2008 | Cowelchuk et al. | 296/187.05 |
| 7,413,237 B2 | * | 8/2008 | Heinze et al. | 296/146.7 |
| 2002/0017805 A1 | * | 2/2002 | Carroll et al. | 296/189 |
| 2004/0017089 A1 | * | 1/2004 | Hunter et al. | 293/120 |
| 2009/0256391 A1 | * | 10/2009 | Hall et al. | 296/187.12 |

* cited by examiner

*Primary Examiner* — Glenn Dayoan
*Assistant Examiner* — George Blankenship
(74) *Attorney, Agent, or Firm* — Shook, Hardy & Bacon LLP (57) ABSTRACT

An integrated door substrate and pelvic bolster is provided for use in a vehicle. The integrated component is formed from a polymerizable material by injection molding. The pelvic bolster is formed from thin lateral walls that buckle and tear under compressive loading. The pelvic bolster is designed to bend but not fracture under load, thus maintaining a continuous loading curve.

8 Claims, 8 Drawing Sheets

DOOR TRIM-INTEGRATED PELVIC IMPACT ENERGY-ABSORBING CONSTRUCTION FOR VEHICLE

TECHNICAL FIELD

The present invention relates generally to collapsible door structures for use with vehicle doors. More particularly, the present invention relates to a collapsible pelvic bolster that is integral with the vehicle door substrate and is produced therewith.

BACKGROUND OF THE INVENTION

Side impact events in vehicles have been identified as one of the top priorities for both research and regulation with government requirements continuing to become more stringent. These additional requirements make designs for door trim systems more challenging because they may impact the door trim at the pelvic bolster. It is known in vehicles to provide a pelvic bolster composed of polymerized foam, such as polyurethane (PU) and expanded polypropylene (EPP). While providing certain attractive features, both materials have limitations. Specifically, in the case of polyurethane, the material cost is relatively high. This becomes of increasing concern particularly as pelvic safety zones are increased in size. In the case of expanded polypropylene, while the cost of this foam tends to be lower than the cost of polyurethane, this material has other limitations. First, expanded polypropylene tends not to use modifiers, so there may be some temperature dependence. Second, expanded polypropylene tends to be heat staked, thus reducing the volume available for energy absorption.

In addition, both polyurethane and expanded polypropylene are inherently separate from the door trim substrate, which adds to manufacturing operations, costs and complexity. Some efforts are being made to provide pelvic bolsters, separate from the door trim substrate, formed from a material other than foam, such as injection molding, but these efforts are also unsatisfactory because of manufacturing and assembly costs.

Accordingly, as in so many areas of vehicle technology, there is room in the art of vehicle door design for an alternative configuration to known pelvic bolster structures which provides effective protection that can be adapted to a variety of shapes while maintaining relatively low manufacturing and assembly costs.

SUMMARY OF THE INVENTION

The present invention generally provides a door assembly in which the energy absorption characteristics are integrated in the door trim substrate by providing a door substrate having a pelvic bolster formed thereon as opposed to the use of a separate foam or plastic piece. The pelvic bolster absorbs energy by placing the door trim substrate and related stiffening features in a complex loading condition, which may include tension, compression, and shear loading. As the occupant intrudes into the door trim, the pelvic bolster absorbs energy by placing the door trim substrate in bending and tension, in a manner similar to a trampoline. The pelvic bolster is designed to bend but not fracture under load, thus maintaining a continuous loading curve.

The molded substrate having the pelvic bolster formed thereon of the disclosed invention is preferably composed of molded polypropylene (PP), but other polymerizable materials may be used. An integrally-molded pelvic bolster is able to generate load more quickly than foam. Accordingly, higher forces earlier in the event allow for a reduction in peak loads later. In addition, the lateral stiffness of the pelvic bolster may be designed to vary significantly over the surface of the bolster so that occupants of different sizes, who would sit in different locations in the vehicle, would see different loads. Simulations have shown that the component design of the disclosed invention meets the requisite loading curves.

Other advantages and features of the invention will become apparent when viewed in light of the detailed description of the preferred embodiment when taken in conjunction with the attached drawings and the appended claims.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

In the following figures, the same reference numerals will be used to refer to the same components. In the following description, various operating parameters and components are described for different constructed embodiments. These specific parameters and components are included as examples and are not meant to be limiting.

Figure 1:
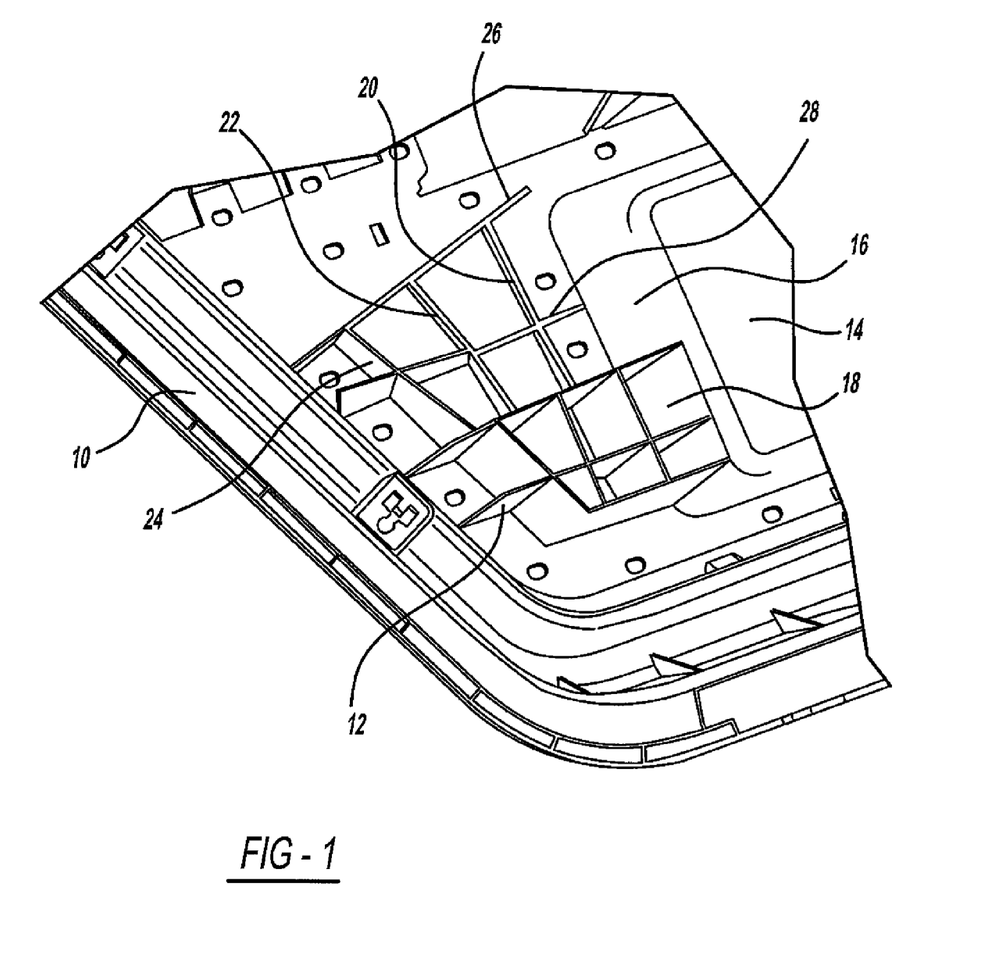
FIG. 1 illustrates a portion of a stiffened panel according to the disclosed invention positioned at a first location of an interior door panel.

With reference to FIG. 1, a view of a door trim substrate 10 is shown from the outboard side of the vehicle, looking inboard. Integral to the door trim substrate 10 is a set of energy absorbing features 12, a storage pocket 14, a storage pocket wall 16, and a storage pocket extension 18. In the preferred embodiment the energy absorbing features include various rib elements, generally illustrated as a first generally vertical rib 20, a second generally vertical rib 22, a third generally vertical rib 24, a first generally horizontal rib 26, and a second generally horizontal rib 28. The rib 24 and the rib 28 are shown having shapes as compared to the other rib elements in order to increase the lateral stiffness of the door trim system at those locations. An occupant's seating position is generally predictive of that occupant's size, which is generally predictive of the occupant's resistance to lateral injuries. The rib structure is shown for illustrative purposes only and is not intended as being limiting.

Figures 2, 3:
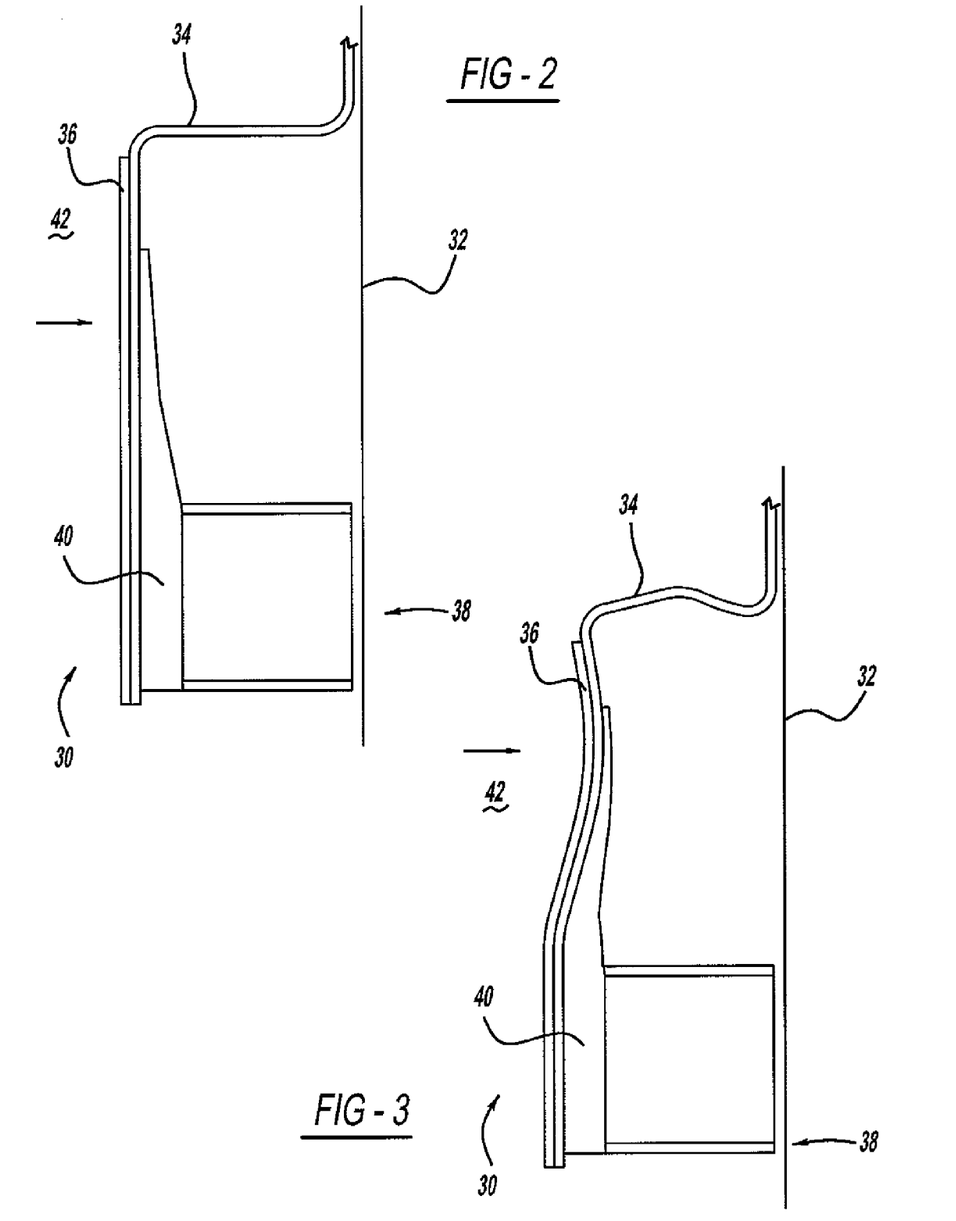
FIG. 2 is a sectional view of a door trim assembly shown prior to the impact of an occupant.
FIG. 3 is the same view of the door trim assembly of FIG. 2 but showing the assembly after impact of an occupant.

With reference to FIG. 2, a sectional view of the door trim system, generally illustrated as 30, is shown prior to occupant contact. The door trim system 30 includes a door inner sheetmetal 32, a door trim substrate 34, and a door trim finish panel 36. Integrally molded into the door trim substrate 34 is a storage pocket extension 38 and an energy absorbing rib 40. In this illustration, any potential appearance concerns are masked by the additional door trim finish panel. Other embodiments may remove the finish panel and cover the door trim substrate with a vinyl or other material. The occupant's pelvis 42 is shown prior to contact with the door trim system.

With reference to FIG. 3, the door trim system 30 is shown following occupant contact. The door trim system 30 is composed of several parts, including the door inner sheetmetal 32, the door trim substrate 34, and the door trim finish panel 36. Integrally-molded into the door trim substrate are two additional features, including the storage pocket extension 38 and the energy absorbing ribs 40. As shown, the occupant's pelvis 42 is interacting with the door trim system 30. As the occupant's pelvis 42 continues to move relative to the door trim system 30, the energy absorbing rib 40 deforms. It is this deformation along with the deformation of the surrounding door trim substrate 34 and the door trim finish panel 36 that absorb substantial levels of crash energy.

Figures 4, 5:
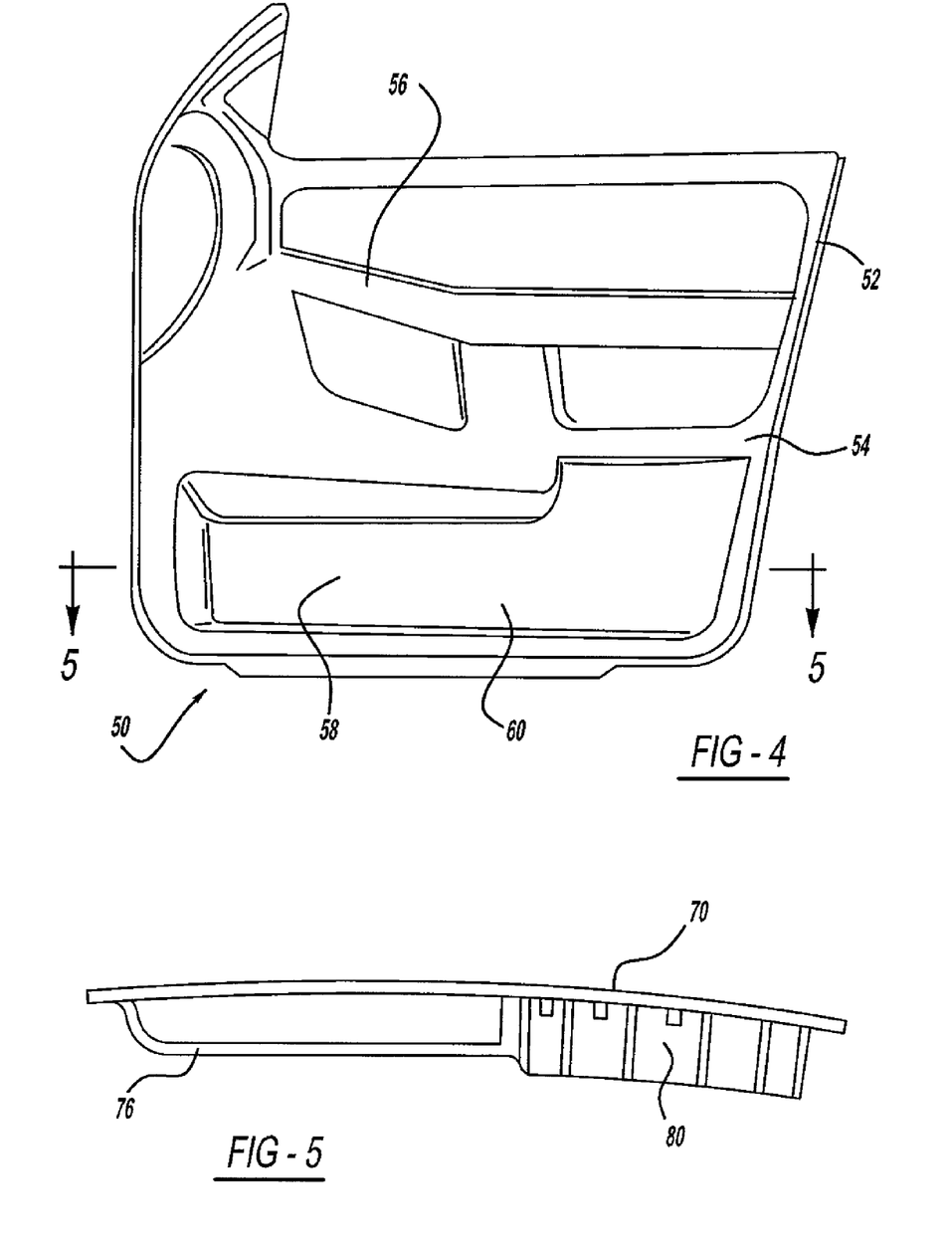
FIG. 4 illustrates a view of a door assembly viewed from the inside of the vehicle having the substrate integrated pelvic bolster of the present invention.
FIG. 5 is a sectional view of the door without the interior door panel of FIG. 4 taken along lines 5-5.

With reference to FIG. 4, a view of a door assembly, generally illustrated as 50, is shown from the inside of the vehicle. The door assembly 50 is of the standard type and it is to be understood that different configurations of the door are envisioned within the scope of the present invention. The door assembly 50 includes an outer panel (or skin) 52, an interior panel 54, an armrest and grab handle assembly 56, a map pocket 58, and a pelvic bolster 60. It is also to be understood that the general configuration of the interior panel 54 and the particular configurations of the armrest and grab handle assembly 56, the map pocket 58, and the pelvic bolster 60 are shown for illustrative purposes only and are not intended as being limiting. Particularly, the armrest and grab handle assembly 56, the map pocket 58, and the pelvic bolster 60 could be configured differently in terms of shape, size and overall configuration.

Figure 6:
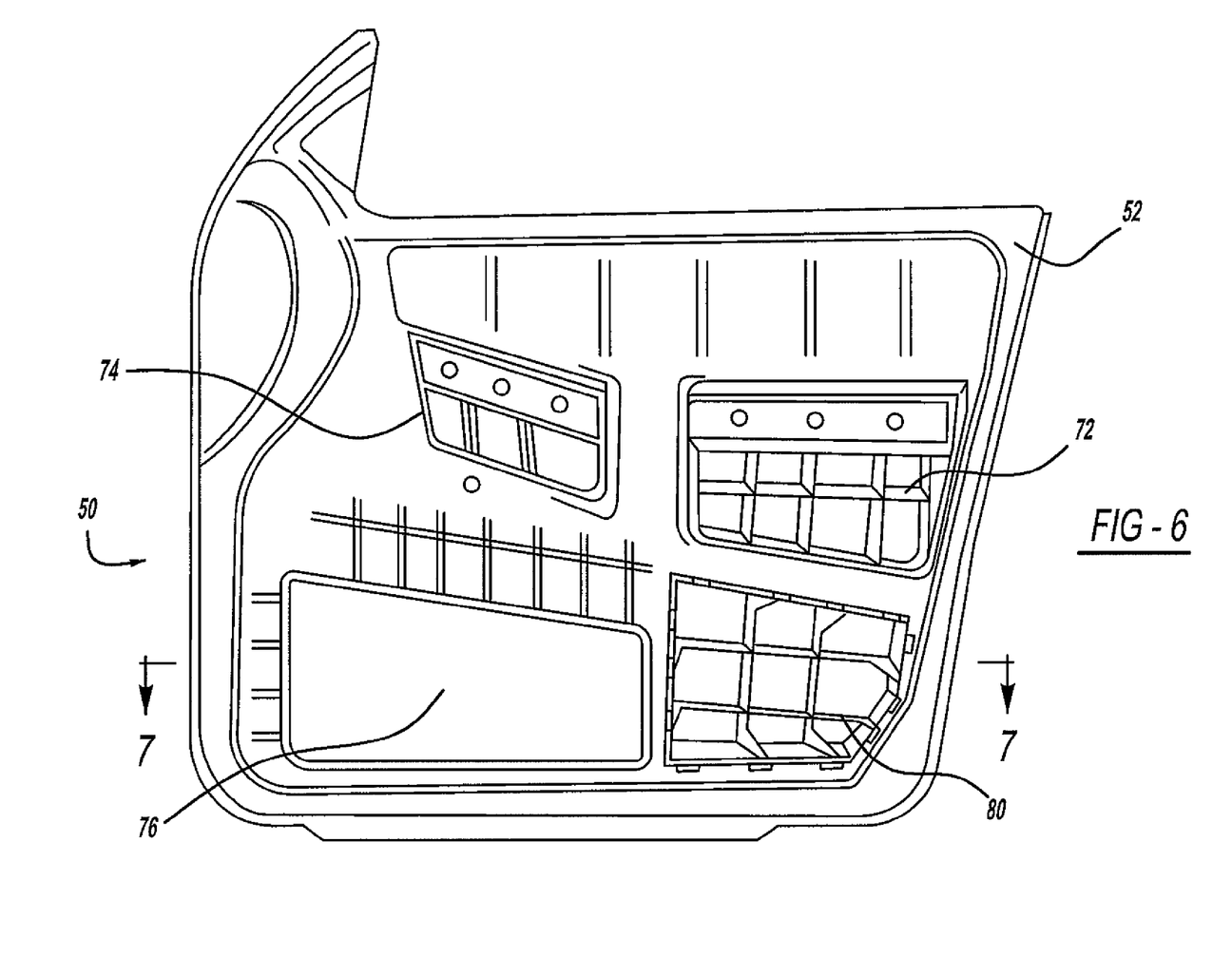
FIG. 6 illustrates a view of the door of FIG. 4 but shown without the interior door panel to reveal the door substrate and support structures formed thereon and illustrating an alternative location from that shown in FIG. 1.

In FIG. 5 and FIG. 6 the interior panel 54 of the door assembly 50 has been removed, revealing a door substrate 70. As is known in the art, the door substrate 70 includes a variety of supporting structures, including, for example, a first armrest support structure 72 and a second armrest support structure 74. It is to be understood that any of a great variety of support structures may be provided in a variety of different configurations.

A door pocket closeout 76 is formed on the door substrate 70 as is known in the art. Adjacent the door pocket closeout 76 is a pelvic bolster support structure 80. The pelvic bolster support structure 80 may also be of a variety of shapes and sizes and it is to be understood that the placement, size and shape of the pelvic bolster support structure 80 illustrated in FIG. 5 and FIG. 6 is for demonstrative purposes only.

According to one of the objectives of the disclosed invention, the pelvic bolster support structure 80 is formed integrally with the door substrate 70 such that, collectively, the pelvic bolster support structure and the door substrate are one and the same piece. This simplifies manufacturing and assembly.

Figure 8:
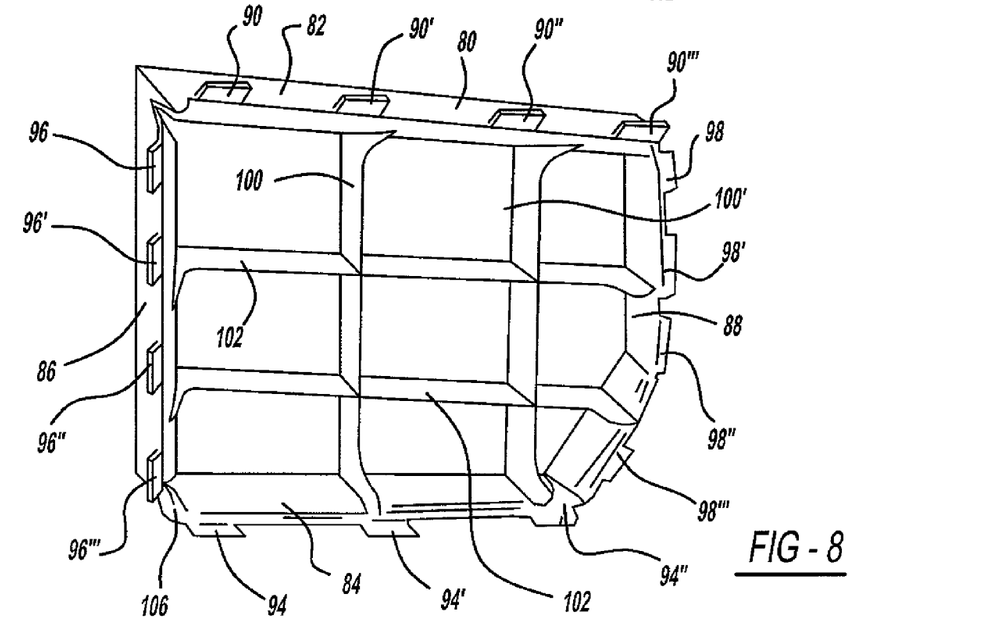
FIG. 8 is a view similar to that of FIG. 7 but showing the pelvic bolster early into an impact event.
Figure 9:
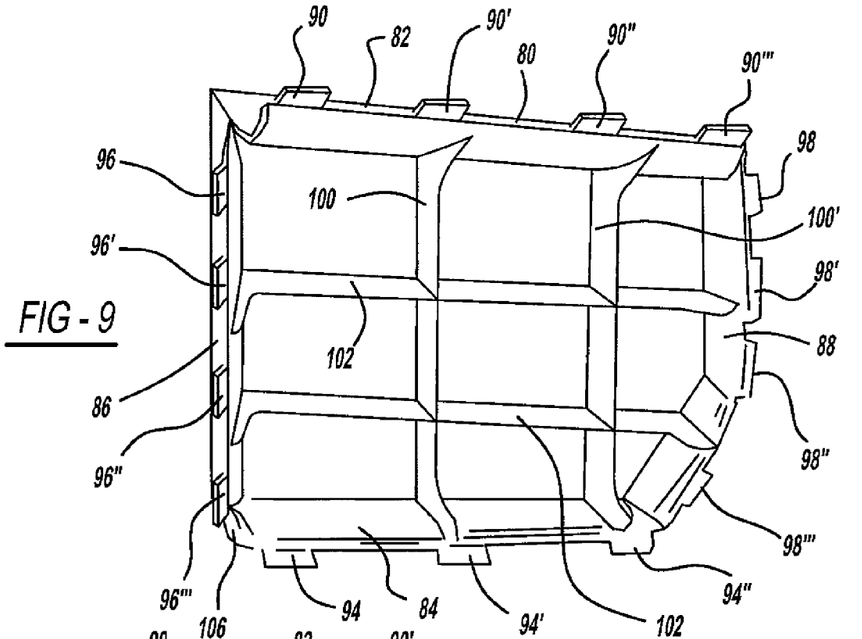
FIG. 9 is a view similar to that of FIG. 8 but showing the pelvic bolster mid-way through the impact event.
Figure 10:
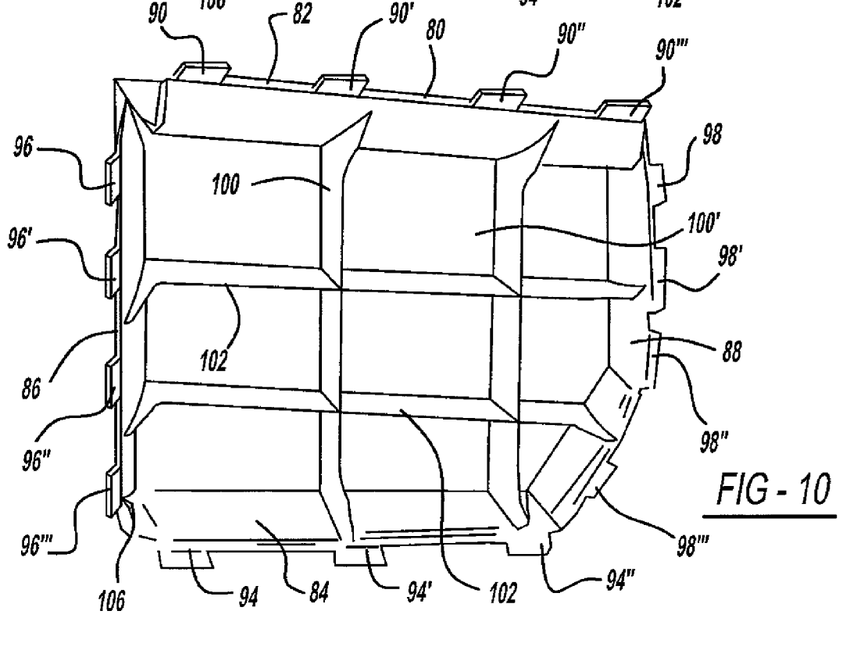
FIG. 10 is a view similar to that of FIG. 9 but showing the pelvic bolster late in the impact event.

To provide the pelvic bolster support structure 80 with the requisite impact-responsive characteristics the pelvic bolster support structure 80 is formed from a series of relatively thin walls that collapse, fold and in some instances tear in a relatively controlled, non-random way. A better understanding of this arrangement may be established by reference to FIG. 7 through FIG. 10 in which the pelvic bolster support structure 80 is first illustrated, in FIG. 7, in its pre-impact state. In FIG. 8 through FIG. 10 the pelvic bolster support structure 80 is illustrated in different stages of an impact event, with FIG. 8 illustrating the pelvic bolster support structure 80 early in an impact event, FIG. 9 illustrating the pelvic bolster support structure 80 mid-way through an impact event, and FIG. 10 illustrating the pelvic bolster support structure 80 at the last stage of the impact.

Figure 7:
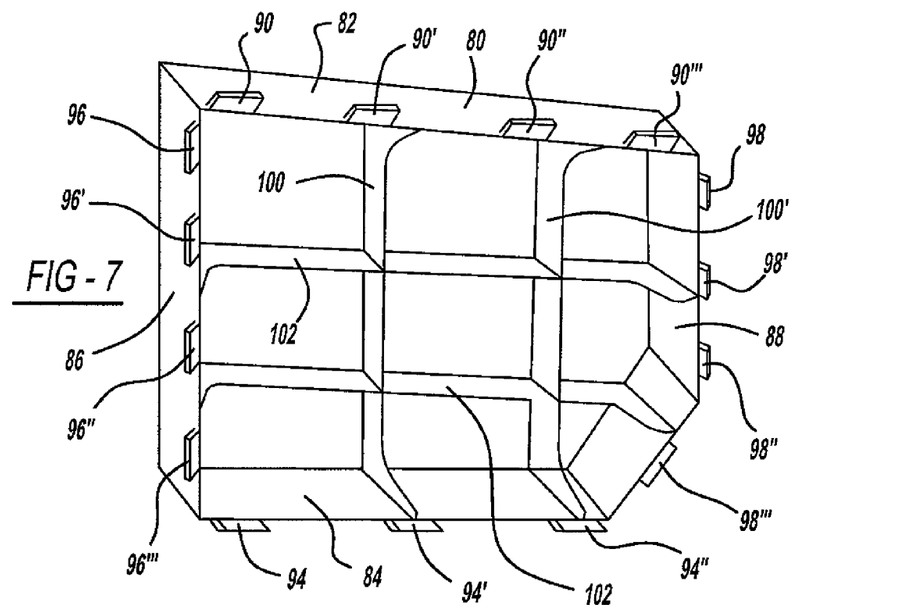
FIG. 7 is a view of the substrate integrated pelvic bolster of the present invention is illustrated prior to an impact event.

With reference to FIG. 7, the pelvic bolster support structure 80 is shown in detail. It is to be understood that the pelvic bolster support structure 80 is an integral part of the door substrate 70 in all of these views. It is also to be understood that the illustrated pelvic bolster support structure is shown in one of many possible arrangements, and thus the illustrated configuration and its related description are provided for non-limiting illustrative and explanatory purposes.

The pelvic bolster support structure 80 includes an upper wall 82, a lower wall 84, a first side wall 86, and a second side wall 88. The walls 82, 84, 86, and 88 may be modified and adapted as needed to fit within a prescribed area. Within the outer structure defined by the walls 82, 84, 86, and 88 are a pair of substantially vertical walls 100 and 100' and a pair of substantially horizontal walls 102 and 102'. A greater or lesser number of vertical and horizontal walls may be provided. The vertical walls 100 and 100' and the horizontal walls 102 and 102' may be formed in a variety of ways. As illustrated, each of these walls is formed to define a recessed area.

Along the upper wall 82 is preferably provided a plurality of flanges 90, 90', 90" and 90'". Along the lower wall 84 is also preferably provided a plurality of flanges 94, 94', and 94". Similarly, along the first side wall 86 is preferably provided a plurality of flanges 96, 96', 96", and 96'" and along the second side wall 88 is preferably provided a plurality of flanges 98, 98', 98", and 98'". All of the flanges are angled away from the pelvic bolster support structure 80. A greater or lesser number of flanges may be provided and the flanges may be of a shape, configuration, and placement other than that as shown. Of course, the flanges themselves may not be provided.

With reference to FIG. 8, the pelvic bolster support structure 80 is shown in the earliest stage of an impact event. The flanges 90, 90', 90" and 90'" on the upper wall 82, the flanges 94, 94', and 94" on the lower wall 84, the flanges 96, 96', 96", and 96'" on the first side wall 86 and the flanges 98, 98', 98", and 98'" on the second side wall 88 have all begun to be pressed downward and outward, as have the walls 82, 84, 86 and 88. This outward motion causes a tearing condition at the seams between the walls 82, 84, 86 and 88, for example, at seams 104, 106 and 108. In addition, the vertical walls 100 and 100' and the horizontal walls 102 and 102' are also beginning to bend.

As the deflection increases, as illustrated in FIGS. 9 and 10, the vehicle occupant (not shown) would contact more and more material to insure that the load increases. As the impact event proceeds as illustrated in FIG. 9, which is about half way through the event, and FIG. 10, which is at the end of the event, the walls 82, 84, 86 and 88 continue to bend outwardly, substantially like a rose petal. The tearing of the seams, such as the seams 104, 106, and 108, also continues.

The walls of the pelvic bolster support structure 80 are preferably formed from a thin polymerized material which substantially enables energy absorption. (If the walls were thick then the pelvic bolster support structure 80 would tend to fracture. Conversely, thin walls bend and provide a more continuous loading curve.) The pelvic bolster support structure 80 works in an impact event because it relies upon relatively thin load-bearing walls in combination with the designed-in outward bending of the walls as guided by the flanges. This arrangement creates a loading curve which is more continuous than those known. The thickness, placement, and arrangement of all of the walls 82, 84, 86, 88, 100, 100', 102 and 102' can be modified or tuned as needed to provide maximum results.

Figure 11:
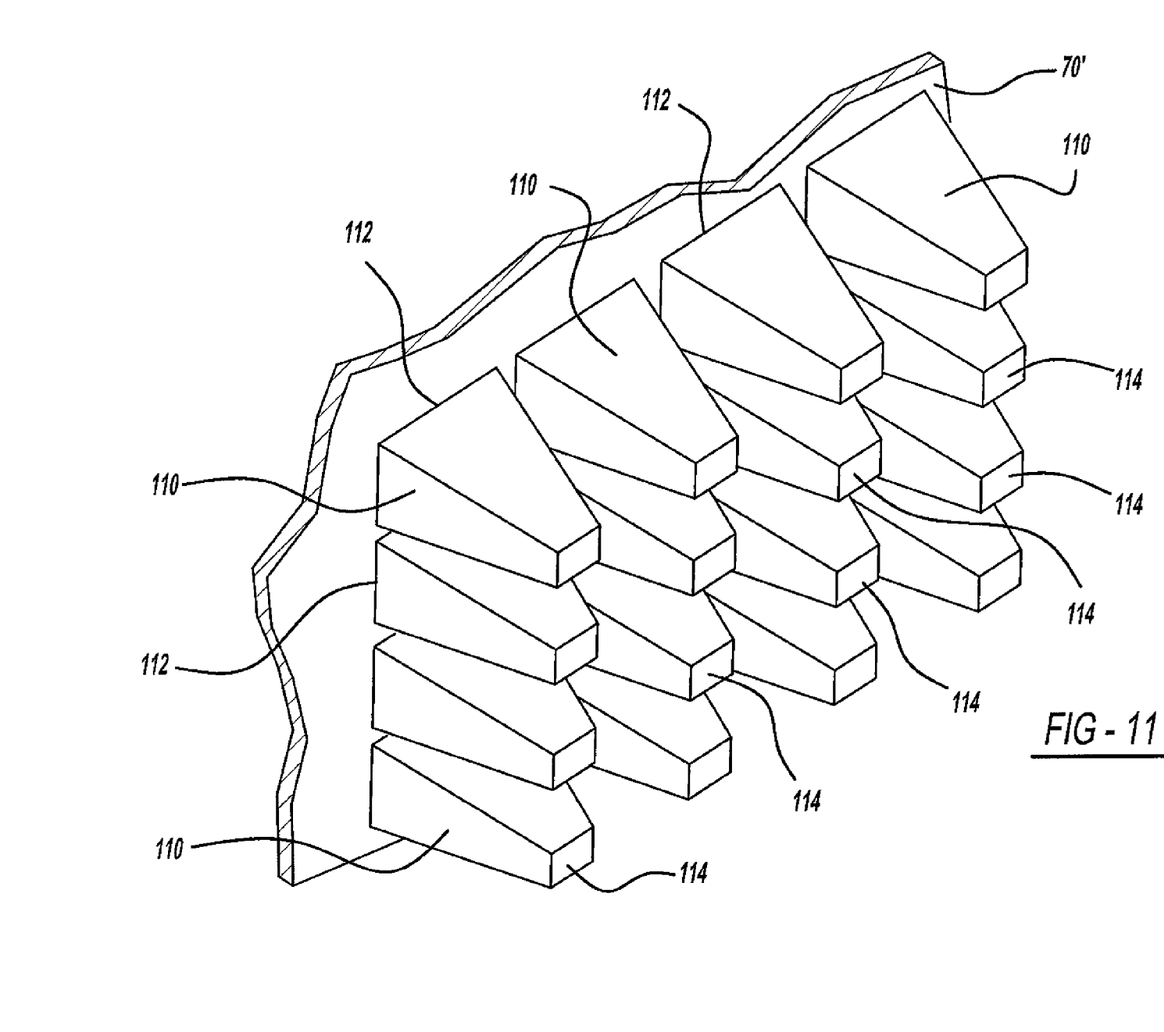
FIG. 11 is a perspective view of an alternate construction of the pelvic bolster of the disclosed invention.
Figure 12:
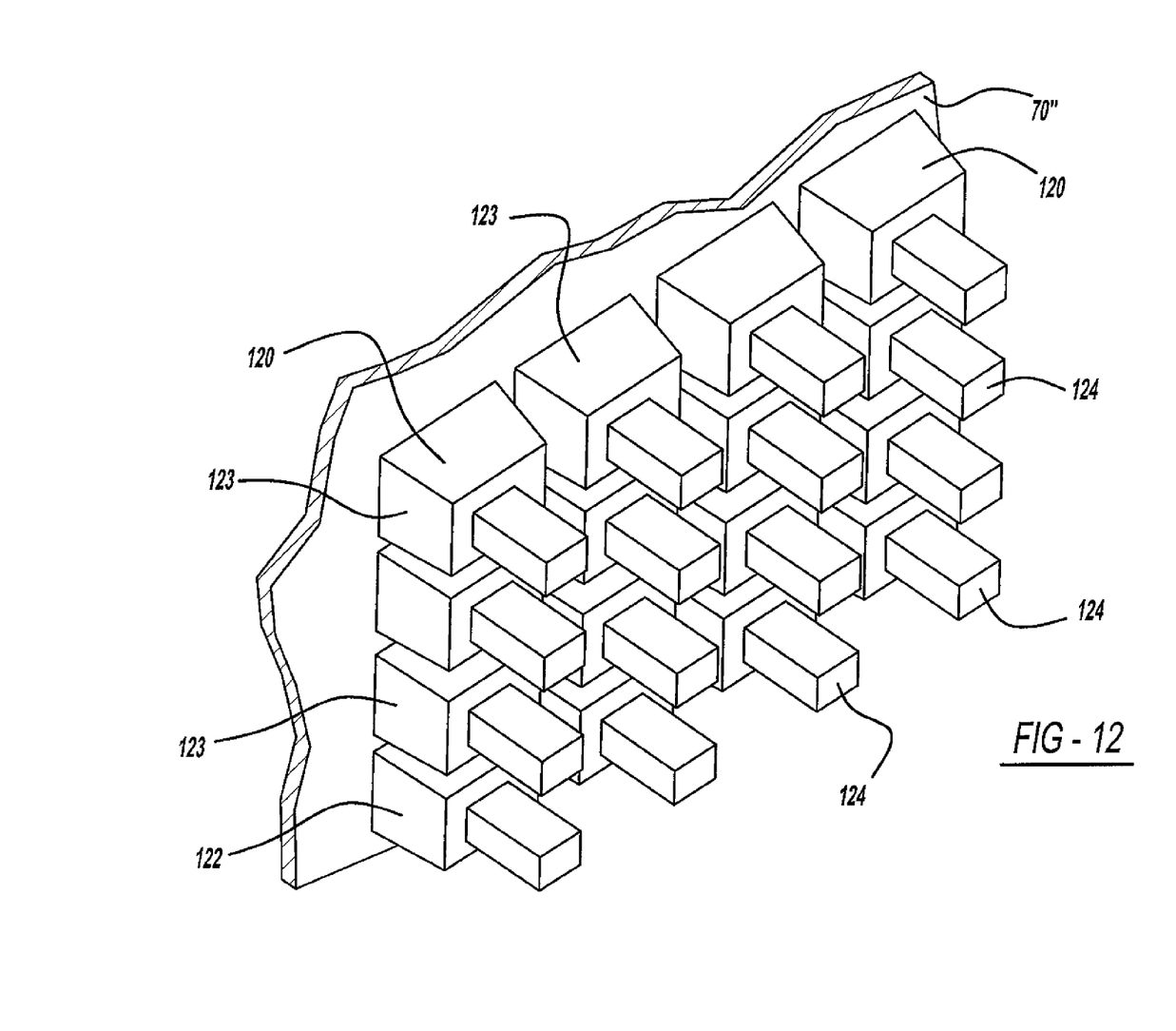
FIG. 12 is a perspective view of an additional construction of the pelvic bolster of the disclosed invention.

While the pelvic bolster support structure of FIGS. 5 through 10 provide an approach to providing the desired integrated pelvic bolster and door substrate, other arrangements are possible and are provided in FIGS. 11 and 12.

With reference first to FIG. 11, a pelvic bolster support structure 110 is illustrated and is formed integral with a door substrate 70'. The pelvic bolster support structure 150 is composed of a plurality of pyramid-like structures having a base 112 that is integrally formed with the door substrate 70' and a top 114. As illustrated, the base 112 is wider than the top 114. The thickness, size, shape, arrangement, and number of the pyramid-like structures may be modified as required to achieve the desired results.

With reference next to FIG. 12, a pelvic bolster support structure 120 is illustrated and is formed integral with a door substrate 70". The pelvic bolster support structure 120 is composed of a plurality of multi-layered structures having a base section 122 that is integrally formed with the door substrate 70" and a top section 124. As illustrated, the base section 122 is wider at its lower end than at its top end. Similarly, the top section 124 is wider at its lower end than at its top end. As with the pelvic bolster support structure 110 of FIG. 11, the thickness, size, shape, arrangement, and number of the multi-layered structures may be modified as required to achieve the desired results. In addition, a greater number of sections may be added. Furthermore, some structures may have a greater or lesser number of sections than adjacent or other structures.

The foregoing discussion discloses and describes exemplary embodiments of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A door assembly for use in a vehicle, the door assembly comprising:
    an outer door panel;
    a substrate attachable to said outer door panel; and
    an occupant impact-absorbing bolster formed on said substrate to form an integrated substrate-bolster component, said bolster having an interior and including a plurality of outer walls, each wall having an outer side and an inner side, said walls having top edges and at least one intersection formed by a four inner intersecting walls attached to said outer walls, each of said intersecting walls having a portion adjacent said at least one intersection, at least one of said outer walls having flanges formed on its top edge, said flanges angled outwardly away from said outer sides of said wall, said at least one of said four intersecting walls having an outer wall end attachment portion, each of said portions adjacent said at least one intersection having lesser heights than said outer wall end attachment portion, whereby a recessed area is defined between said outer walls.

2. The door assembly of claim 1 wherein said plurality of walls interconnect substantially at right angles.

3. The door assembly of claim 1 wherein said impact-absorbing bolster comprises a plurality of spaced apart, collapsible structures.

4. The door assembly of claim 1 wherein said integrated substrate-bolster component is formed from injection molding.

5. A door substrate for use on a door in a vehicle, the door substrate comprising:
    a substrate portion for attachment to the door; and
    a pelvic bolster portion having an interior, said pelvic bolster portion and said substrate portion defining a single component, said pelvic bolster being composed of a plurality of outer walls having top edges and at least two inner intersecting walls attached to said outer walls, said at least two inner intersecting walls intersecting to define an intersection, said intersection having a height, each of said two inner intersecting walls having intersection portions adjacent said intersection, said inner intersecting walls having outer wall end attachment portions, said outer wall end attachment portions having a height, said height of said intersection being less than said height of at least one of said outer wall end attachment portions, said intersection portions of said two inner intersecting walls adjacent said intersection each having lesser heights than said outer wall end attachment portions, whereby a recessed area is defined between said outer walls.

6. The door substrate of claim 5 wherein said plurality of walls interconnect substantially at right angles.

7. The door substrate of claim 5 wherein said pelvic bolster portion comprises a plurality of spaced apart, collapsible structures.

8. A method of forming a door assembly for a vehicle, the method comprising the steps of:
    forming an integral, one-piece door substrate which includes a pelvic bolster support structure, said pelvic bolster support structure including a bolster, said bolster having an interior and including a plurality of outer walls having top edges and a plurality of inner intersecting walls attached to said outer walls, at least some of said plurality of intersecting walls intersecting to define intersections, at least the majority of said intersections having a height,
    said inner intersecting walls having outer wall end attachment portions, said outer wall end attachment portions having heights, said height of said majority of intersections being less than the height of at least one of said outer wall end attachment portions; and
    attaching said integral, one-piece door substrate to a vehicle door.

* * * * *